US012154718B2

(12) United States Patent
Pearson-Monti

(10) Patent No.: US 12,154,718 B2
(45) Date of Patent: Nov. 26, 2024

(54) METHOD FOR USING A METALLIC SHARPS INSTRUMENT

(71) Applicant: Martha Sue Pearson-Monti, Phoenix, AZ (US)

(72) Inventor: Martha Sue Pearson-Monti, Phoenix, AZ (US)

( * ) Notice: Subject to any disclaimer, the term of this patent is extended or adjusted under 35 U.S.C. 154(b) by 0 days.

(21) Appl. No.: 18/197,214

(22) Filed: May 15, 2023

(65) Prior Publication Data

US 2023/0282402 A1 Sep. 7, 2023

Related U.S. Application Data

(63) Continuation of application No. 17/750,820, filed on May 23, 2022, now Pat. No. 11,688,538, which is a continuation of application No. 15/931,314, filed on May 13, 2020, now Pat. No. 11,373,790, which is a continuation of application No. 14/975,463, filed on Dec. 18, 2015, now abandoned.

(60) Provisional application No. 62/102,723, filed on Jan. 13, 2015.

(51) Int. Cl.
*H01F 7/02* (2006.01)
*B65D 85/00* (2006.01)

(52) U.S. Cl.
CPC ........... *H01F 7/0273* (2013.01); *B65D 85/70* (2013.01)

(58) Field of Classification Search
CPC ........ D05B 921/12; D05B 91/12; B25H 3/06; H01F 7/0252; H01F 7/0221; H01F 7/0247; B65D 83/02; B65D 2313/04; B65D 85/24; D05D 2207/06
See application file for complete search history.

(56) References Cited

U.S. PATENT DOCUMENTS

| | | | | | |
|---|---|---|---|---|---|
| 2,386,500 | A * | 10/1945 | Parker | B43M 99/004 | 248/187.1 |
| 2,455,506 | A * | 12/1948 | Leslie | D05B 91/12 | 211/DIG. 1 |
| 2,457,421 | A * | 12/1948 | Warren | B43M 99/009 | 211/DIG. 1 |
| 2,888,136 | A * | 5/1959 | La Borde | D05B 91/12 | 206/751 |
| 3,906,658 | A * | 9/1975 | Gross | A63H 33/26 | D11/131 |

(Continued)

*Primary Examiner* — Robert Poon
(74) *Attorney, Agent, or Firm* — Bradley K. DeSandro; DESANDRO LAW GROUP PLLC

(57) ABSTRACT

An organizer for a plurality of metallic objects has a nonmetallic housing and a magnetic core. The nonmetallic housing has opposing top and bottom external surfaces. A ridge projects from a periphery of the top external surface. The magnetic core attracts metal towards the geometric center of the top external surface and towards the ridge at the periphery of the top external surface. In some implementations, portions of the magnetic field attract metal in the directions: (i) perpendicular to the geometric center of the top external surface; (ii) outward from the geometric center of the top external surface; and (iii) toward the ridge on the top external surface. Implementations have the magnetic core with a square cross section and north and south poles separated by a distance substantially less than the width of the substantially square cross section, and with its magnetic field in the shape of a torus.

20 Claims, 5 Drawing Sheets

(56) References Cited

U.S. PATENT DOCUMENTS

| | | | | |
|---|---|---|---|---|
| 3,982,631 | A * | 9/1976 | Kunik | D05B 91/12 211/DIG. 1 |
| 4,427,960 | A * | 1/1984 | Wuerfel | H01F 7/0252 335/306 |
| 11,186,932 | B2 * | 11/2021 | Snow | B65D 85/24 |

* cited by examiner

Fig. 2a
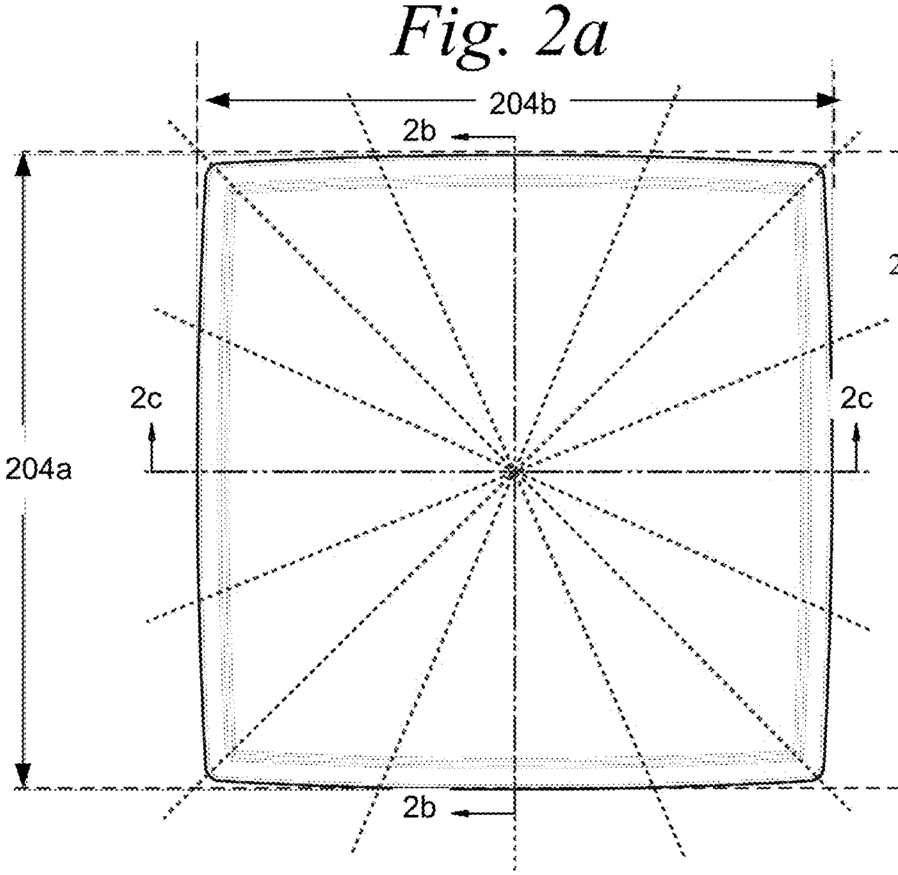
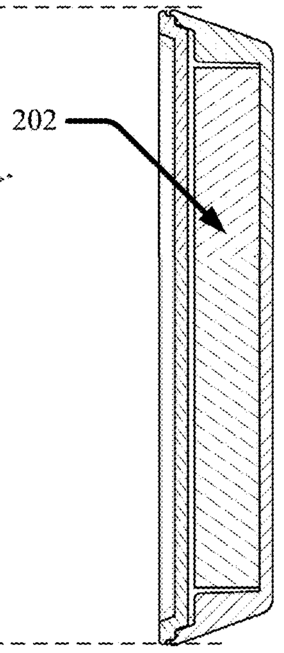
Fig. 2b
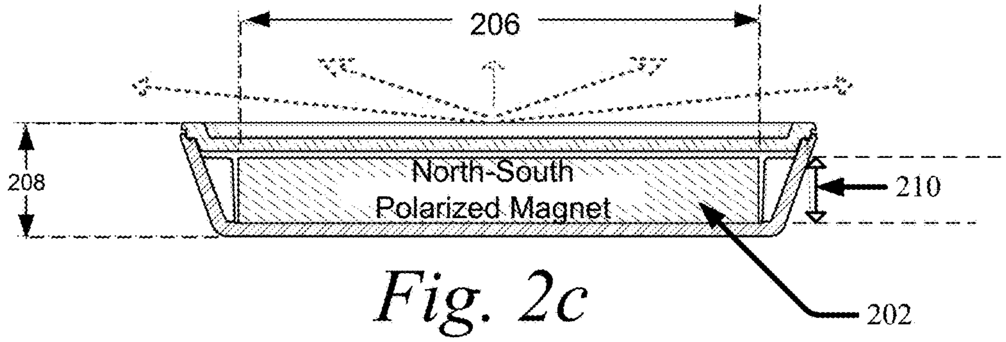
Fig. 2c

*Fig. 3a*
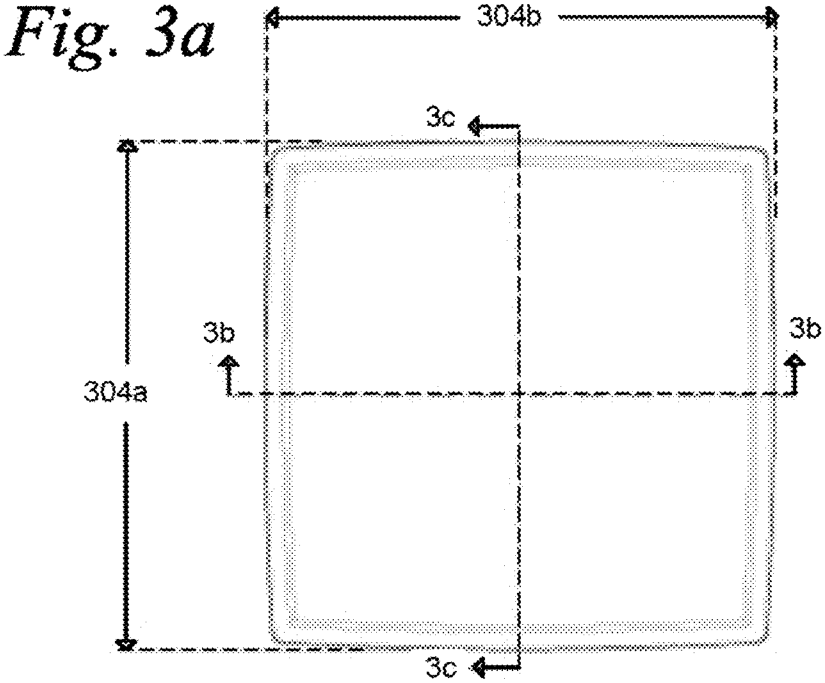
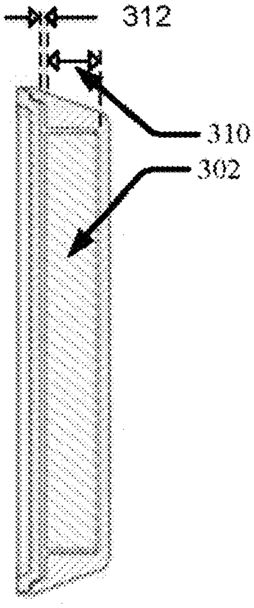
*Fig. 3c*
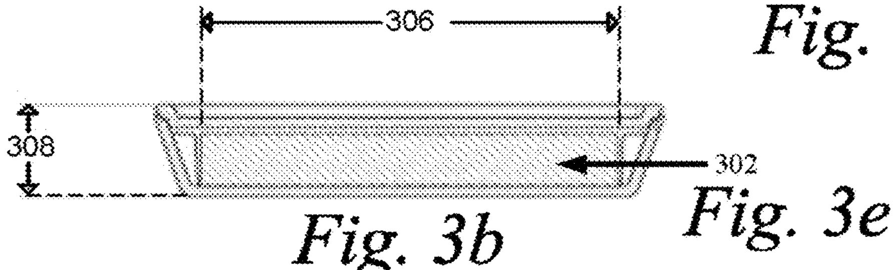
*Fig. 3b*
*Fig. 3e*
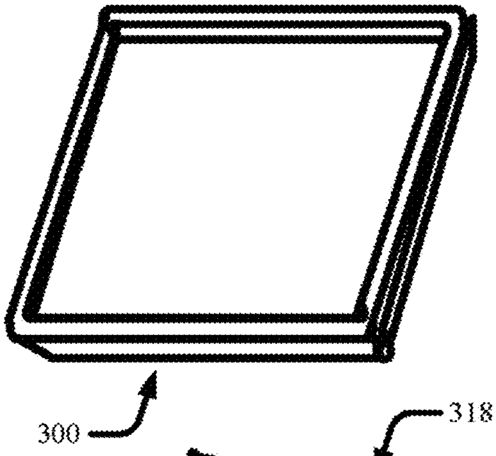
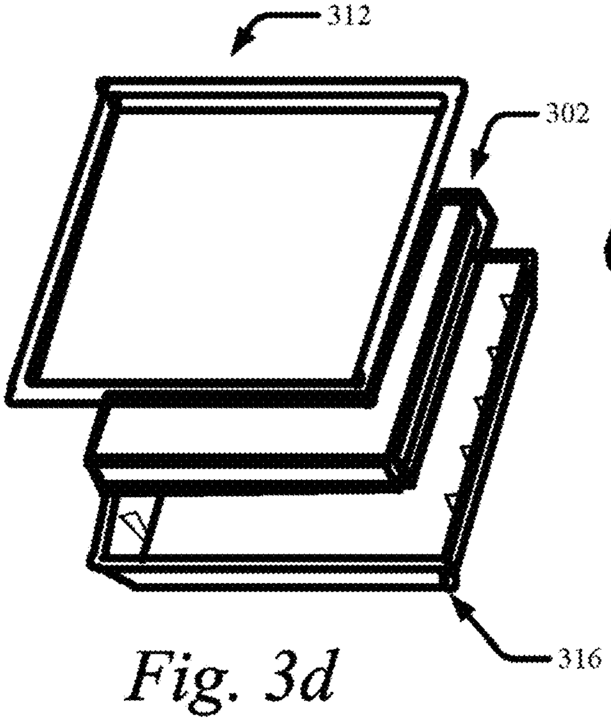
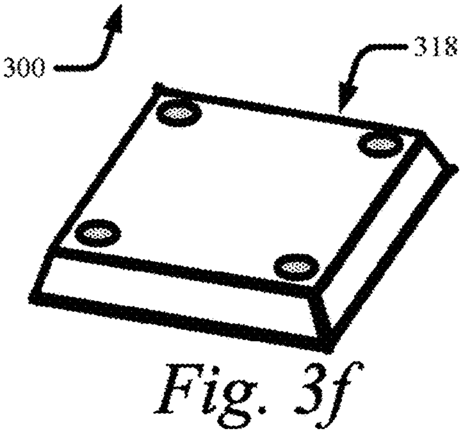
*Fig. 3d*
*Fig. 3f*

*Fig. 4a*
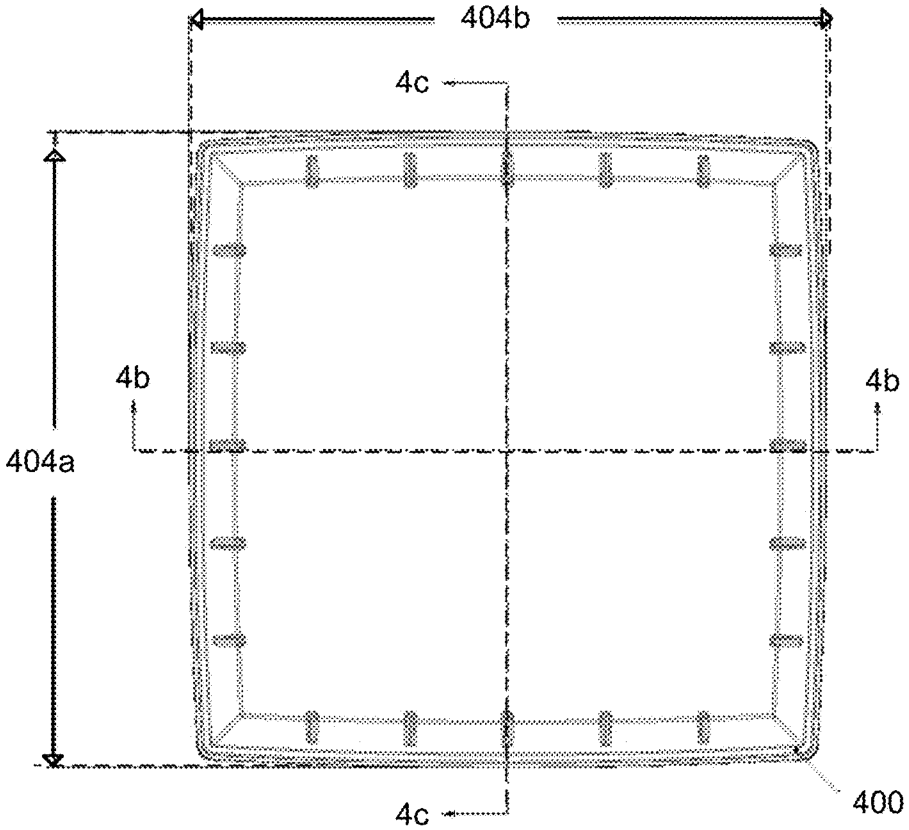
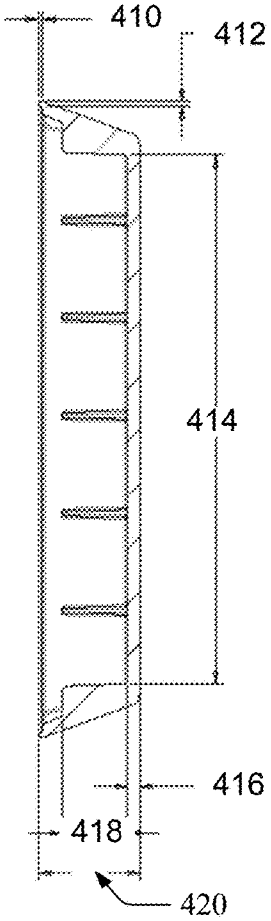
*Fig. 4c*
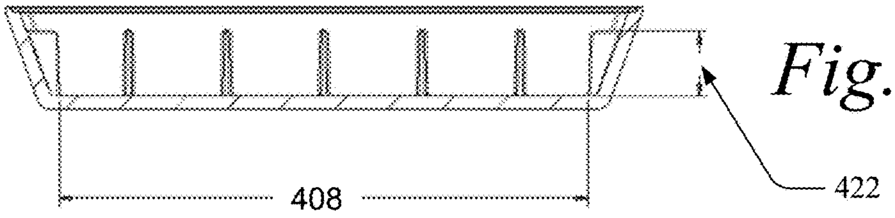
*Fig. 4b*

*Fig. 5d*
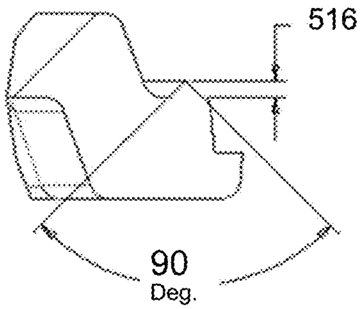
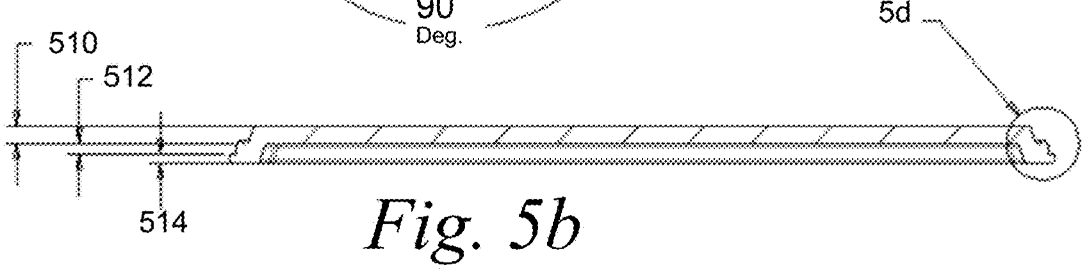
*Fig. 5b*
*Fig. 5c*
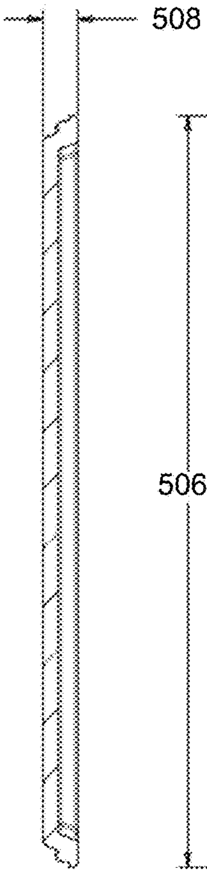
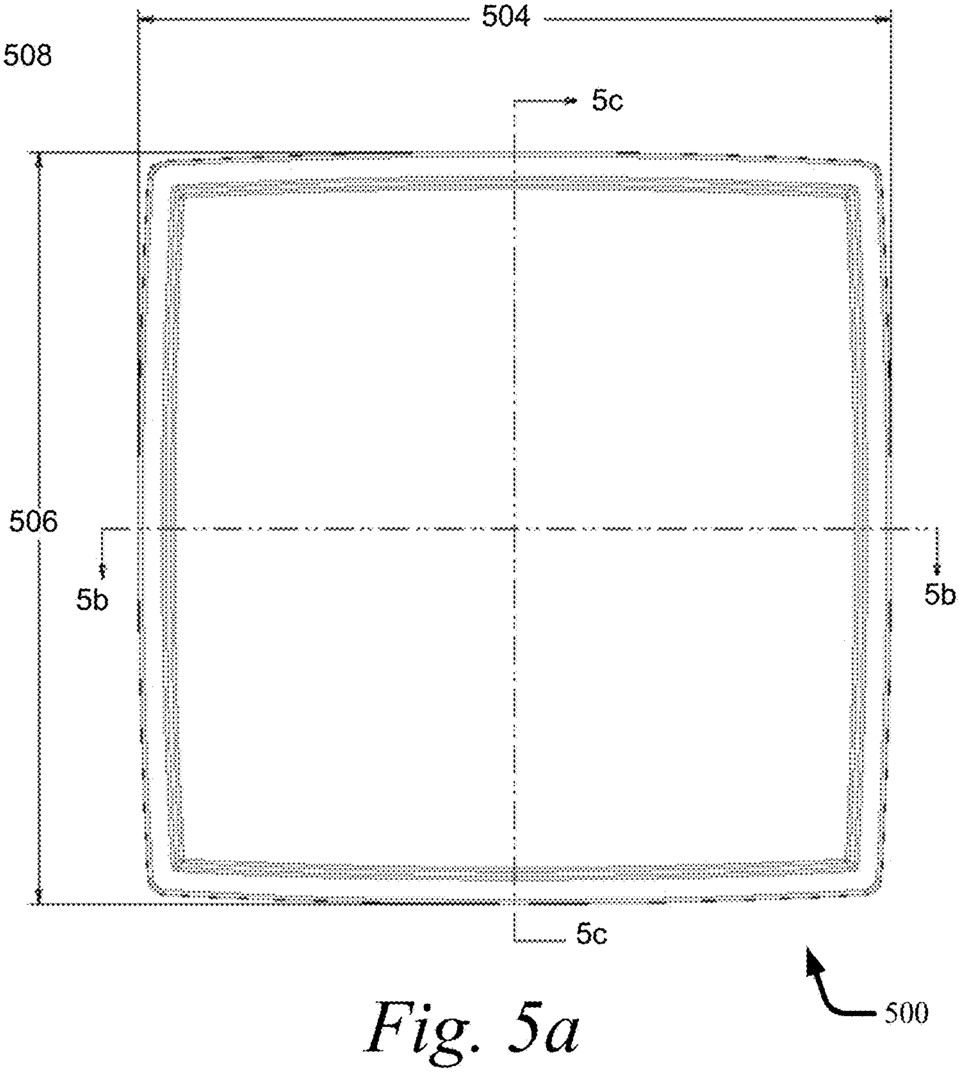
*Fig. 5a*

METHOD FOR USING A METALLIC SHARPS INSTRUMENT

RELATED APPLICATIONS

This application claims priority to and the benefit of: (i) U.S. patent application Ser. No. 17/750,820, filed on May 23, 2022, titled "Sharps Medical Instrument Organizer"; and (ii) U.S. patent application Ser. No. 15/931,314, filed on May 13, 2020, titled "Medical Tool Organizer", now U.S. Pat. No. 11,383,790, issued on Jun. 28, 2022; (iii) U.S. patent application Ser. No. 14/975,463, filed on Dec. 18, 2017, titled "Metallic Object Organizer,"; and (iv) U.S. Provisional Application Ser. No. 61/102,723 filed on Jan. 13, 2015, titled "Magnetic holder that has polarization thru thickness of magnet thus creating a radial conductor which repels and separates items into a "sunburst" (radial) pattern aligning them around edge of casing. Casing top has recessed surface, an integral part of the design to create a raised edge for the items to sit angled down & stop items from flipping over the edge. Ultra-sonic welding is the process to secure magnet inside the casing. Casing can be made in any shape using these integral designs," wherein each of the foregoing is incorporated herein by reference in their respective entireties.

FIELD

Implementations disclosed herein relate to an object organizer, more particularly relate to an organizer for a plurality of metallic objects, and most particularly relate to an organizer that organizes a plurality of thin, linearly oriented, metallic objects by use of a magnetic field.

BACKGROUND

Thin, linear, metallic objects are used for a variety of construction and repair projects undertaken by both professionals and amateurs. Non-limiting examples of such a professional or amateur whose work makes use of thin, linear, metallic objects, one at a time, include a tailor or seamstress employed at sewing who uses straight pins, sewing needless, and safety pins, a beautician who uses bobby pins, a healthcare provider who uses hypodermic needles, surgical blades, and suture needles, a fishing lure manufacturer who makes fishing lures with fishing hooks, a carpenter or auto mechanic who uses nails, cotter pins, clips, screws and bolts, an office worker who uses office supplies such as paperclips and staples.

When undertaking a construction or repair project, the professional or amateur must use their fingers to reach into a bulk pile or stack of these thin, linear, metallic objects in order to retrieve one such object because only such individual object is used at a time for the construction or repair project. After one such metallic object has been used by the professional or amateur, another such metallic object must be retrieved from the pile or stack for use, and so on throughout the course of the project.

The disarray and entanglement of one such metallic object with other such metallic objects within and throughout the pile or stack can be frustrating to the professional or amateur. In fact, numerous attempts and complex manual manipulations may be required by the professional or amateur in order to separate one of the metallic objects away from the other metallic objects. The repeated complex, and time consuming requirement to separate one metallic object from the pile or stack of the metallic objects introduces frustration to the professional or amateur due to the reduction in the efficiency of their work by virtue of the increased time required to complete the construction or repair project. Once such frustration and/or reduction in the efficiency occurs when the thin, linear, metallic object has a pointed and/or sharp end, such as do needles, surgical blades, and fishing hooks, where the sharp end is likely to inflict injury on a professional or amateur when attempting to manually separate one such object from a stack or pile of such objects.

In would be an advance in the construction, repair and other relevant arts to provide an organizer for thin, linear, metallic objects that organizes a stack or pile of such objects into separated, individual metallic objects, such that each metallic object is automatically separated from the other such metallic objects, thereby allowing the professional or amateur to efficiently and safely select and manually pick up each such separated metallic object from among the other separated metallic objects during the course of a construction or repair project.

BRIEF DESCRIPTION OF THE DRAWINGS

Implementations discussed herein will become more apparent from the detailed description set forth below when taken in conjunction with the drawings.

FIGS. 1*b*-1*c* show neither the respective organizer from which the magnetic field is emanating nor a respective magnet from which the magnetic field is emanating, where each portion of each magnetic field illustrated in FIGS. 1*b*-1*c* may be circumscribed by and/or concentric with other said portions (not shown) of the respective magnetic field;

FIG. 2*a* shows a top planar view of an exemplary implementation of an organizer for thin, linear, metallic objects that encases a magnet emanating a magnetic field that organizes a stack or pile of such objects into separated, individual metallic objects, such that each metallic object is automatically separated from the other such metallic objects, thereby allowing a professional or amateur to efficiently and safely select and manually pick up each such separated metallic object from among the other separated metallic objects during the course of a construction or repair project;

FIGS. 2*b*-2*c* are side cross section views of FIG. 2*a* taken along lines 2*b*-2*b* and 2*c*-2*c*, respectively;

FIG. 3*a* shows a top planar view of an exemplary implementation of an organizer for thin, linear, metallic objects that encases a magnet emanating a magnetic field that organizes a stack or pile of such objects into separated, individual metallic objects, such that each metallic object is automatically separated from the other such metallic objects, thereby allowing a professional or amateur to efficiently and safely select and manually pick up each such separated metallic object from among the other separated metallic objects during the course of a construction or repair project;

FIGS. 3*b*-3*c* are side cross section views of FIG. 3*a* taken along lines 3*b*-3*b* and 3*c*-3*c*, respectively;

FIG. 3*d* is an exploded perspective view illustrating exemplary bottom, top and magnetic components of the organizer seen in FIGS. 3*a*-3*c*.

FIGS. 3*e*-3*f* are top and bottom perspective views, respectively, of the organizer seen in FIGS. 3*a*-3*c*.

FIG. 4*a* is a top planar view of an implementation of the bottom component of the organizer seen in FIGS. 3*a*-3*c*.

FIGS. 4*b*-4*c* are side cross section views of FIG. 4*a* taken along lines 4*b*-4*b* and 4*c*-4*c*, respectively, and are marked for description herein relative to proportional dimensions;

FIG. 5*a* is a top planar view of an implementation of the top component of the organizer seen in FIGS. 3*a*-3*c*.

FIG. 5*b* is a cross section cutaway view of FIG. 5*a* taken along line 5*b*-5*b*, and marked for description herein relative to proportional dimensions;

FIG. 5*c* is a cross section view of FIG. 5*a* taken along line 5*c*-5*c*, and marked for description herein relative to proportional dimensions; and FIG. 5*d* is a cross section cutaway view of FIG. 5*a* taken about line 5*d*, and marked for description herein relative to proportional dimensions.

DETAILED DESCRIPTION

Figure 1A:
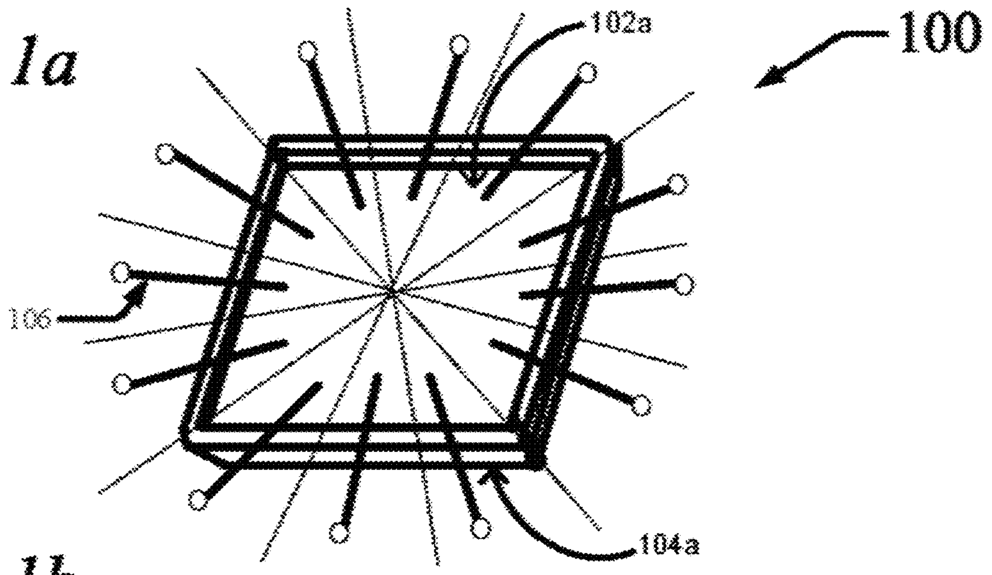
FIG. 1*a* illustrates a perspective view of an exemplary implementation of an organizer for thin, linear, metallic objects that encases a magnet emanating a magnetic field that organizes a stack or pile thereof into separated, individual metallic objects, such that each metallic object is automatically separated from the other such metallic objects, thereby allowing a professional or amateur to efficiently and safely select and manually pick up each such separated metallic object from among the other separated metallic objects during the course of a construction or repair project.

Various non-limiting implementations of the invention are seen in the Figures. Generally seen at reference numeral 100 is an organizer for thin, linearly oriented, metallic objects. Encased within the organizer 100 is a magnet or magnetic core, not seen in FIG. 1*a*, and from which a magnetic field emanates. Organizer 100 has respective top and bottom portions 102*a*, 102*b*, both of where are substantially square in cross section, where, as seen in FIG. 1*a*, the distance there between is substantially less than the width of either. A raised lip or ridge projects from the periphery of top portion 102*a* of organizer 100 and is connected to the bottom portion 104*a* by a tapered external surface.

Figure 1B:
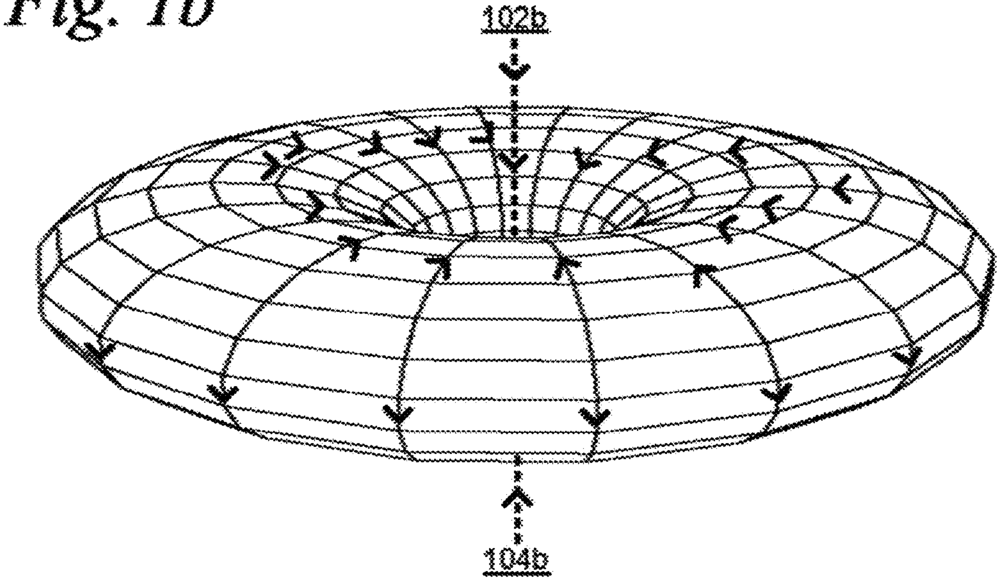
FIGS. 1*b*-1*c* show respective implementations of a portion of a magnetic field emanating from an implementation of an organizer, such as is seen in FIG. 1*a*, although
Figure 1C:
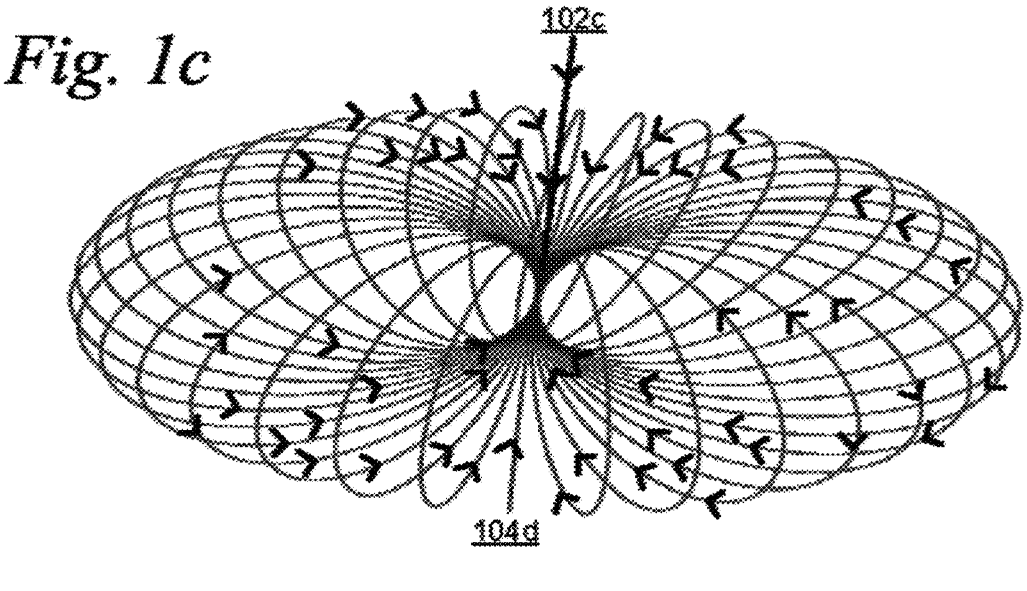

By way of example, and not by way of limitation, respective representations of a portion of a magnetic field emanating from a magnet or magnetic core encased within organizer 100 (not shown) are seen in FIGS. 1*b*-1*c*. Each magnetic field has respective top and bottom portions 102*b*, 102*c*. In addition to the configuration of the magnetic fields, a portion of which is seen respectively in FIGS. 1*b*-1*c*, magnetic fields emanating from other magnets in a plurality of different configurations, both as to the magnetic field and as to the magnet(s) encased within organizer 100, are also contemplated in further implementations of the organizer.

The magnetic field, a portion of which is depicted by way of example in FIG. 1B, will have an effect on a plurality of linearly oriented metallic objects 106 in that one end of each will be attracted towards the center of top portion 102*b* and the opposing end of each will be attracted so as to position the metallic object 106 radially outward from the top portion 102*a* of organizer 100 as each metallic object 106 subjected to the force of the magnetic field. The force of the magnetic field seen in FIG. 1B will have a similar effect on similar metallic objects so as to be attracted towards the center of bottom portion 104*b* (not shown) and radially outward therefrom as each metallic object 106 is controlled by the force of the magnetic field.

The force of the magnetic field, a portion of which is illustrated in FIG. 1*c*, will have an effect on the metallic objects 106 as shown in FIG. 1*a* in that they will each be attracted both towards the center of top portion 102*c* and radially outward therefrom as each metallic object 106 is subjected to the force of the magnetic field. The force of the magnetic field, a portion of which is seen in FIG. 1*c*, will have a similar effect on similar metallic objects so as to be attracted both towards the center of bottom portion 104*b* (not shown) and radially outward therefrom as each metallic object 106 is subjected to the force of the magnetic field.

Referring back to FIG. 1*a*, a plurality of thin, linearly oriented, metallic objects 106 are shown upon and in contact with both the top portion 102*a* of organizer 100 and upon the raised lip or ridge projection the extends from the periphery of top portion 102*a* of organizer 100. Although the metallic objects 106 depicted in FIG. 1*a* are stick pins, other thin, linearly oriented, metallic objects, either alone or in any combination, are contemplated for use with organizer 100 including, but are not limited to, straight pins, sewing needless, safety pins, bobby pins, hypodermic needles, surgical blades, suture needles, fishing hooks, nails, cotter pins, clips, screws, bolts, staples and paperclips.

The force of the magnetic field emanating from a magnet (not shown) encased in the organizer 100 will cause each metallic object 106 be separated from the other metallic objects 106 as the metallic object 106 is situated within a portion of the magnetic field that is not occupied by another metallic object 106. As each subsequent metallic object 106 falls onto, or is brought into contact with, the top portion 102*a* of organizer 10, the force of the magnetic field emanating from the magnet (not shown) encased in the organizer 100 will cause each subsequent metallic object 106 be separated from the other metallic objects 106 as the subsequent metallic object 106 is situated within a different portion of the magnetic field that that is not already occupied by another metallic object 106.

When a stack or pile of metallic objects 106 are simultaneously, or sequentially, dropped onto, or brought into contact with, the top portion 102*a* of organizer 100, the force of the magnetic field, such as those illustrated by portions thereof illustrated in either of FIGS. 1*b*-1*c*, causes each metallic object 106 to be substantially, equidistantly, and individually separated from the other metallic objects 106 as shown by the distribution and arrangement of metallic objects 106 in FIG. 1*a*. The force and direction of the magnetic field also causes each metallic object 106 to be positioned such that one end thereof is radially directed towards the center of the top portion 102*a* of organizer 100, and so that the opposite end thereof is positioned outside of and on top of the raised lip or ridge projection located on the periphery of top portion 102*a* of organizer 100 as shown in FIG. 1*a*. As such, the position of most, if not all, of the metallic objects 106 on the top surface of the organizer 100 will have an acute angle with respect to the top surface of the organizer 100. Note that the radially oriented separation of each metallic object 106 from the other metallic objects 106, as shown in FIG. 1*a*, will continue as each such metallic object 106 is subsequently dropped onto, or brought into contact with, the top portion 102*a* of organizer 100 so as to come under the influence of the force of a portion of the magnetic field that is not yet occupied by another such metallic object 106. This individualized distribution of metallic objects 106 will continue until the entire surface of the top portion 102*a* of organizer 100 is substantially covered by one layer of radially oriented metallic objects 106.

Note also that when a plurality of the metallic objects 106 are simultaneously or sequentially dropped onto, or brought into contact with, the bottom portion 104*a* of organizer 100 (not shown), the force of the magnetic field, such as either of those seen in FIGS. 1*b*-1*c*, will also cause each metallic object 106 to be automatically, substantially, equidistantly, and individually separated from the other metallic objects 106 such as is illustrated in FIG. 1*a*.

When so positioned by the force of the magnetic field, each metallic object 106 on the organizer 100 will have been organized out of a stack or pile thereof so as to be separated as individual metallic objects 106. Advantageously, the force of the magnetic field automatically separates each metallic object 106 from the other such metallic objects 106 as shown in FIG. 1*a*. This separation allows a professional or amateur to select and manually pick up one such separated metallic object 106 at the end thereof that is positioned outside of and on top of the raised lip or ridge projection located on the periphery of top portion 102*a* of organizer 100 as shown in FIG. 1*a*. As such, each individual metallic object 106 can be efficiently selected by hand so as to be manually removed from the other metallic objects 106 on the top portion 102*a* of organizer 100 during the course of a construction or repair project. Moreover, when each such individual metallic object 106 has one or more pointed or sharp ends, as do those seen FIG. 1*a*, each metallic object can be safely selected by hand and manually removed from the other metallic objects 106 without being likely to inflict injury on a professional or amateur.

FIGS. 1*b*-1*c* show respective implementations of a portion of a magnetic field emanating from an implementation of an organizer such as is seen in FIG. 1*a*, although FIGS. 1*b*-1*c* show neither the respective organizer from which the magnetic field is emanating nor a respective magnet from which the magnetic field is emanating. In one implementation, a cross section of a magnetic field, such as may be taken through a geometric center of opposing top and bottom external surfaces of the implementations of the organizer seen in FIG. 1*a*, has a shape that is substantially an ellipse. In another implementation of a magnetic field emanating from an implementation of an organizer such as is seen in FIG. 1*a*, the magnetic field has a surface of revolution generated by revolving a circle in three-dimensional space about an axis coplanar with the circle. In yet another implementation, a magnetic field emanating from an implementation of an organizer such as is seen in FIG. 1*a* substantially has torus shape.

A variety of views of an implementation of the organizer 100 seen in FIG. 1*a* are shown in FIGS. 2*a*-*c*. Encased within organizer in FIGS. 2*a*-*c* is a North-South Polarized Magnet shown by way of cross-sections at reference numeral 202 in FIGS. 2*b*-2*c* and having a width 206 and a height 210 seen in FIG. 2*c* that is less than the widths 204*a*, 204*b* of the organizer as shown in FIG. 2*a*. A height 208 of the organizer is shown in FIG. 2*c*. A portion of a magnetic field is illustrated in phantom as emanating from North-South Polarized Magnet 202 along the top surface of the organizer as shown in phantom in FIGS. 2*a* and 2*c*.

In various implementations, the size and shape of the North-South Polarized Magnet can be different depending upon both the size of the housing for the magnet and the desired size and shape of the magnetic field to be emanated therefrom. The organizer will preferably encase a magnet having a north and south pole where the distance between the poles is substantially less than the width of either the top and opposing bottom of the magnet, and the distance between the top and opposing bottom of the magnetic is substantially less than the width of the top and opposing bottom of the magnetic. For example, the width and height of the magnet will have a proportion of a least 2 to 1, preferably a proportion of 4 to 1 and most preferably a proportion of 8 to 1.

In a preferred implementation, the organizer seen in FIGS. 2*a*-2*c* has a North-South Polarized Magnet 202 that is substantially square in cross section and has width 206 about eight (8) times height 210. This implementation provides an organizer that organizes a stack or pile of thin, linearly oriented metallic objects into separated, individual metallic objects, such that each metallic object is automatically separated from the other such metallic objects, thereby allowing a professional or amateur to select and manually pick up each such separated metallic object from among the other separated metallic objects during the course of a construction or repair project so that the professional or amateur can use their fingers to efficiently and safely retrieve one such object because only such individual object is used at a time for the construction or repair project.

A variety of views of the organizer seen in FIGS. 2*a*-2*c* are shown in FIGS. 3*a*-*c* and FIGS. 3*e*-*f*, with top and bottom perspective views of the organizer shown in FIGS. 3*e*-3*f* at reference numerals 300 and 318, respectively. Encased within the organizer in FIGS. 3*a*-*c* and FIGS. 3*e*-*f* is a North-South Polarized Magnet shown by way of cross-sections at reference numeral 302 in FIGS. 3*b*-3*c* and in perspective at reference numeral 302 of FIG. 3*d*. North-South Polarized Magnet 302 has a width 308 as seen in FIG. 3*b* that is less than the width 306 of the organizer as shown in FIG. 3*a*. A dimension 310 of the organizer is shown in FIG. 3*b*, and a top surface of the organizer is seen in FIG. 3*a* as being substantially square in shape with widths 304*a*, 304*b*. An exploded view of the organizer in FIG. 3*d* reveals top and bottom components 312, 316 encasing North-South Polarized Magnet 302. Top portion 312 has a bottom wall having a thickness generally shown at reference numeral 312.

A bottom component 400 seen in FIG. 4*a* is an implementation of the bottom component 316 of the organizer seen in FIGS. 3*a*-3*f*, where the implementation is shown in a variety of views of FIGS. 4*a*-4*c*. Dimensions of bottom component 400 are generally shown at reference numerals 404-420 in FIGS. 4*a*-4*c*. In this implementation of bottom component 316 of the organizer seen in FIGS. 3*a*-3*f*, bottom component 400 is depicted so as to incorporate a plurality of positioning ridges as shown in FIGS. 4*a*-4*c*, each of which projects from an inside wall of bottom component 400. In this implementation of bottom component 400 shown in FIGS. 4*a*-4*c*, the positioning ridges position one or more magnets, such as North-South Polarized Magnet 202, 302 respectively shown in FIGS. 2*b*-2*c* and 3*b*-3*d*, so as to be positioned within the center of the organizer. Bottom component 400 will preferably be composed of a material that is not magnetically attracted, be substantially square in cross section, and have widths 404*a*, 404*b*.

A top component 500 seen in FIG. 5*a* is an implementation of the top component 312 of the organizer seen in FIGS. 3*a*-3*f*, where the implementation is shown in a variety of views of FIGS. 5*a*-5*c*. Dimensions of top component 500 are generally shown at reference numerals 504-516 in FIGS. 5*a*-5*c*. Top component 500 is secured to bottom component 400 seen in FIG. 4*a* so as to optionally for a hermetically sealed, and/or water resistant, compartment for a magnetic core (not shown). The securing means for top and bottom components 400, 500 can be by way of friction fit, chemical adhesive, or sonic welding, either alone or in any combination. Other securing means as are known to those in the relevant arts are also contemplated. Top component 500 will preferably be composed of a material that is not magnetically attracted, be substantially square in cross section, and have widths 504, 506.

Variation and modifications will be apparent to those skilled in the art, and the embodiments of the invention described and illustrated are not intended to be limiting. The principles of the invention contemplate many alternatives having advantages and properties evident in the exemplary implementations.

The steps of a method, process, or algorithm described in connection with the implementations disclosed herein may be performed in the order described or shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed implementations is provided to enable any person of ordinary skill in the art to make or use the disclosure. Various modifications to these implementations will be readily apparent to those of ordinary skill in the art, and the generic principles defined herein may be applied to other implementations without departing from the spirit or scope of the disclosure. Thus, the disclosure is not intended to be limited to the implementations shown herein but is to be accorded the widest scope consistent with the principles and novel features disclosed herein.

The invention claimed is:

1. A method for using a metallic sharps instrument, the method comprising:

placing a plurality of the metallic sharps instruments, each having a minimum length, on a housing, wherein:
- the housing has a nonmetallic surface;
- each said metallic sharps instrument contacts the nonmetallic surface;
- the housing encloses a magnet;
- the nonmetallic surface has a dimension greater than the minimum length of each said metallic sharps instrument;
- a periphery of the nonmetallic surface has a projection therefrom;
- the magnet:
  - has a substantially rectangular cross section; and
  - emits a magnetic field forcing:
    - opposing ends of the metallic sharps instruments on the nonmetallic surface respectively:
      - towards the geometric center of the nonmetallic surface; and
      - away from the geometric center of the nonmetallic surface so as to extend past the projection from the periphery of the nonmetallic surface; and
    - the metallic sharps instruments on the nonmetallic surface so as to be oriented in:
      - a substantially common plane; and
      - a substantially circular pattern;

and
  - has opposing poles, wherein the width of the substantially rectangular cross section is greater than a distance separating the opposing poles;

and removing for use at least one said metallic sharps instrument from the substantially:
- common plane; and
- circular pattern.

2. The method as defined in claim 1, wherein the magnet attracts metal towards the geometric center of the nonmetallic surface.

3. The method as defined in claim 1, wherein the magnetic field emanating from the magnet attracts metal both towards and away from the geometric center of the nonmetallic surface.

4. The method as defined in claim 1, wherein a cross section of a magnetic field emanating from the magnet taken through the geometric center of the nonmetallic surface has a shape that is substantially an ellipse.

5. The method as defined in claim 1, wherein a magnetic field emanating from the magnet has a shape of a surface of revolution generated by revolving a circle in three-dimensional space about an axis coplanar with the circle.

6. The method as defined in claim 1, wherein a magnetic field emanating from the magnet has:
- a shape of a surface of revolution generated by revolving a circle in three-dimensional space about an axis coplanar with the circle; and
- a cross section taken through the geometric center of the external nonmetallic surface that has a shape that is substantially an ellipse.

7. The method as defined in claim 1, wherein the magnet attracts metal both towards and away from the geometric center of the nonmetallic surface.

8. The method as defined in claim 1, wherein:
- the magnet attracts metal both towards and away from the geometric center of both the nonmetallic surface;
- a cross section of a magnetic field emanating from the magnet taken through the geometric center of the nonmetallic surface has a shape that is substantially an ellipse;

and
- the magnetic field emanating from the magnet has a shape of a surface of revolution generated by revolving a circle in three-dimensional space about an axis coplanar with the circle.

9. A method for using a metallic sharps instrument, the method comprising:

placing on a top planar surface of a nonmetallic housing a plurality of linearly oriented metallic sharps instruments each having a minimum length and first and second opposing ends, wherein:
- the nonmetallic housing encloses a magnetic member;
- the nonmetallic housing has a bottom planar surface opposing the top planar surface;
- a lip projects substantially perpendicularly from the periphery of the top planar surface, wherein the lip at the periphery of the top planar surface is connected to the opposing said bottom planar surface by a tapered external surface;
- the magnetic member has opposing poles and a substantially rectangular cross section the width of which is greater than a distance separating the opposing poles;

and
- portions of a magnetic field, each being substantially in the shape of a torus, emanate from the magnetic member such that:
  - the plurality of metallic linearly oriented metallic sharps instruments are attracted to the top planar surface of the nonmetallic housing;
  - the second end of each said metallic linearly oriented metallic sharps instrument opposite the first end is attracted towards the geometric center of the top and bottom planar surfaces, wherein each of the top and bottom planar surfaces have a dimension greater than the minimum length of each said metallic linearly oriented metallic sharps instrument;

the second end of each said metallic linearly oriented metallic sharps instrument is attracted radially outward from the geometric center of the top and bottom planar surfaces so as to extend over and past the lip at the periphery of the top planar surface;

and the plurality of metallic linearly oriented metallic sharps instruments on the top planar surface of the nonmetallic housing are substantially arranged in:

a common plane; and a circular pattern;

and removing for use at least one said metallic sharps instrument from the substantially:

common plane; and circular pattern.

10. The method as defined in claim 9, wherein the magnetic field:

attracts metal towards the portion of each said planar surface that is substantially the geometric center thereof; and that emanates from the magnetic member attracts metal radially:

toward the geometric center of both opposing planar surfaces; and outward from the geometric center of both opposing planar surfaces.

11. The method as defined in claim 9, wherein the magnetic field:

attracts metal towards the portion of each said planar surface that is substantially the geometric center thereof;

emanating from the magnetic member attracts metal radially:

toward the geometric center of both opposing planar surfaces; and outward from the geometric center of both opposing planar surfaces;

and has a surface of revolution generated by revolving a circle in three-dimensional space about an axis coplanar with the circle.

12. The method as defined in claim 9, wherein:

the magnetic field:

attracts metal towards the portion of each said planar surface that is substantially the geometric center thereof;

emanating from the magnetic member attracts metal radially:

toward the geometric center of both opposing planar surfaces; and outward from the geometric center of both opposing planar surfaces;

and has a surface of revolution generated by revolving a circle in three-dimensional space about an axis coplanar with the circle;

and the projection at the periphery of the planar surface is connected to the opposing said planar surface by a tapered external surface.

13. A method for using a metallic sharps instrument, the method comprising:

placing on a top planar surface of a nonmetallic housing a plurality of linearly oriented metallic sharps instruments each having a minimum length and first and second opposing ends, wherein:

the nonmetallic housing encloses a magnetic member;

the nonmetallic housing has a bottom planar surface opposing the top planar surface;

a lip projects substantially perpendicularly from the periphery of the top planar surface of the nonmetallic housing, wherein the lip at the periphery of the top planar surface of the nonmetallic housing is connected to the opposing said bottom planar surface of the nonmetallic housing by a tapered external surface;

the magnetic member has opposing poles and a substantially rectangular cross section the width of which is greater than a distance separating the opposing poles;

and portions of a magnetic field, each being substantially in the shape of a torus, emanate from the magnetic member such that:

the plurality of metallic linearly oriented metallic sharps instruments are attracted to the top planar surface of the nonmetallic housing;

the second end of each said metallic linearly oriented metallic sharps instrument opposite the first end is attracted towards the geometric center of the top and bottom planar surfaces of the nonmetallic housing, wherein each of the top and bottom planar surfaces of the nonmetallic housing have a dimension greater than the minimum length of each said metallic linearly oriented metallic sharps instrument;

the second end of each said metallic linearly oriented metallic sharps instrument is attracted radially outward from the geometric center of the top and bottom planar surfaces of the nonmetallic housing so as to extend over and past the lip at the periphery of the top planar surface of the nonmetallic housing;

and the plurality of metallic linearly oriented metallic sharps instruments on the top planar surface of the nonmetallic housing are substantially arranged in:

a common plane; and a circular pattern;

wherein the magnetic field emanating from the magnetic member:

attracts metal towards the portion of each said planar surface of the nonmetallic housing that is substantially located at the geometric center thereof; and emanates from the magnetic member so as to attract metal radially:

toward the geometric center of both opposing planar surfaces of the nonmetallic housing;

outward from the geometric center of both opposing planar surfaces of the nonmetallic housing;

has a surface of revolution generated by revolving a circle in three-dimensional space about an axis coplanar with the circle;

and the projection at the periphery of the planar surface of the nonmetallic housing is connected to the opposing said planar surface of the nonmetallic housing by a tapered external surface;

and removing for use at least one said metallic sharps instrument from the substantially:

common plane; and circular pattern.

14. The method as defined in claim 13, wherein the magnetic member attracts metal towards the geometric center of the top planar surface of the nonmetallic housing.

15. The method as defined in claim 13 wherein the magnetic field emanating from the magnetic member attracts metal both towards and away from the geometric center of the top planar surface of the nonmetallic housing.

16. The method as defined in claim 13, wherein a cross section of a magnetic field emanating from the magnetic member taken through the geometric center of the top planar surface of the nonmetallic housing has a shape that is substantially an ellipse.

17. The method as defined in claim 13, wherein a magnetic field emanating from the magnetic member has a shape of a surface of revolution generated by revolving a circle in three-dimensional space about an axis coplanar with the circle.

18. The method as defined in claim 13, wherein a magnetic field emanating from the magnetic member has:

a shape of a surface of revolution generated by revolving a circle in three-dimensional space about an axis coplanar with the circle; and a cross section taken through the geometric center of the top planar surface of the nonmetallic housing that has a shape that is substantially an ellipse.

19. The method as defined in claim 13, wherein the magnetic member attracts metal both towards and away from the geometric center of the top planar surface of the nonmetallic housing.

20. The method as defined in claim 13, wherein:

the magnetic member attracts metal both towards and away from the geometric center of the top planar surface of the nonmetallic housing;

a cross section of a magnetic field emanating from the magnetic member taken through the geometric center of the top planar surface of the nonmetallic housing has a shape that is substantially an ellipse;

and the magnetic field emanating from the magnetic member has a shape of a surface of revolution generated by revolving a circle in three-dimensional space about an axis coplanar with the circle.

* * * * *